United States Patent
Ye et al.

(10) Patent No.: US 9,881,012 B1
(45) Date of Patent: Jan. 30, 2018

(54) EFFICIENT INTERRUPTION OR TERMINATION OF ARCHIVE OPERATIONS

(71) Applicant: Veritas Technologies LLC, Mountain View, CA (US)

(72) Inventors: Yuanzhou Ye, Reading (GB); Richard P. Glanville, Wokingham (GB); Richard P. Jones, Reading (GB); Steven Bull, Reading (GB)

(73) Assignee: Veritas Technologies LLC, Mountain View, CA (US)

( * ) Notice: Subject to any disclaimer, the term of this patent is extended or adjusted under 35 U.S.C. 154(b) by 270 days.

(21) Appl. No.: 14/754,985

(22) Filed: Jun. 30, 2015

(51) Int. Cl.
*G06F 17/00* (2006.01)
*G06F 17/30* (2006.01)

(52) U.S. Cl.
CPC .... *G06F 17/30073* (2013.01); *G06F 17/3089* (2013.01); *G06F 17/30117* (2013.01); *G06F 17/30371* (2013.01)

(58) Field of Classification Search
CPC .............. G06F 17/30; G06F 17/30073; G06F 17/30117; G06F 17/30371

USPC .................................................. 707/600–899
See application file for complete search history.

(56) References Cited

U.S. PATENT DOCUMENTS

2002/0103982 A1* 8/2002 Ballard ............... G06F 11/0727 711/162

* cited by examiner

*Primary Examiner* — Isaac M Woo
(74) *Attorney, Agent, or Firm* — Campbell Stephenson LLP (57) ABSTRACT

Various systems, methods, and processes for interrupting and/or terminating an archive operation and/or archive process are disclosed. A determination is made as to whether an archive operation is ongoing. Files being written to a storage device as part of the archive operation are monitored. Upon receiving a request to interrupt or terminate the archive operation, the initiation of writing of new files to the storage device is inhibited, and the completion of the writing the files being written to the storage device is permitted. The archive operation and/or archive process is then interrupted or terminated without the risk of data corruption.

20 Claims, 11 Drawing Sheets

EFFICIENT INTERRUPTION OR TERMINATION OF ARCHIVE OPERATIONS

FIELD OF THE DISCLOSURE

This disclosure relates to data storage and archiving, and, more particularly, to efficiently interrupting or terminating archive operations.

DESCRIPTION OF THE RELATED ART

Employees and/or individuals in companies and/or organizations often participate in online conversations with each other and/or other third parties using one of several commercially available software applications. These "messaging" applications provide a convenient and centralized platform for individuals to communicate with each other, for example, over a network such as the Internet. When such online conversations are ongoing, the content of these online conversations and/or messages (e.g., in the form of text files, audio files, video files, and the like) is organized in a message database. The contents of the message database can then be archived to a storage device (either permanently or temporarily) for purposes of compliance and/or discovery (e.g., during litigation and/or a corporate transaction).

Currently-available messaging applications provide export functionalities which permit the archiving of such messages. For example, message data can be written to a storage device for the purposes of archiving, as discussed above. However, there may exist a need to interrupt or terminate an ongoing archive operation (e.g., for the purposes of configuring and/or maintaining the archive database, the message database, and/or the archive software itself). Currently-available messaging applications provide functionalities that can interrupt or terminate such archive operations. However, abruptly interrupting or terminating an ongoing archive operation may leave partially written data (e.g., exported content of online conversations in the form of message files) on a disk, which in turn, may lead to data corruption.

SUMMARY OF THE DISCLOSURE

Various systems, methods, and processes for interrupting and/or terminating an archive operation and/or archive process are disclosed. One such method involves determining whether an archive operation is ongoing, and monitoring files being written to a storage device as part of the archive operation. The method then receives a request to interrupt or terminate the archive operation. Upon receiving the request, the method inhibits initiation of writing of one or more new files to the storage device, and permits writing of one or more files being written to the storage device to complete. The method then interrupts or terminates the archive operation without the risk of data corruption.

In one embodiment, the files being written to the storage device are monitored as part of creating and closing files for the archive operation. In another embodiment, the monitoring includes intercepting file system calls associated with the files, and recording a file handle associated with each of the files in a handle list. For example, the method also accesses the handle list and determines whether the handle list includes any recorded file handles. The method then interrupts or terminates the archive operation if there are no recorded file handles in the handle list.

In some embodiments, the file system calls are initiated by an operating system in response to a command. The command is created using an application programming interface (API). When executed, the command starts the archive operation. In other embodiments, intercepting the file system calls includes accessing an import address table. The import address table lists one or more Dynamic Link Libraries (DLLs). In this example, the file system calls include one or more file operations associated with the operating system.

In another embodiment, the method can alter the import address table by replacing the addresses of one or more of the file system calls with an address of a shutdown handler. The method then can override one or more file system calls by utilizing the import address table to access the shutdown handler. In this example, the shutdown handler is configured to interact with a lower layer DLL, and the file system calls are initiated by the archiving operation.

In one embodiment, the request to interrupt or terminate the archive operation is received at a server, and the server is communicatively coupled to an archive. The archive is stored on the storage device.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

This disclosure may be better understood, and its numerous objects, features, and advantages made apparent to those skilled in the art by referencing the accompanying drawings.

While the present disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents, and alternatives falling within the spirit and scope of the disclosure as defined by the appended claims.

DETAILED DESCRIPTION

Introduction

Numerous online messaging techniques have become popular, and include techniques such as instant messaging (IM). IM is a type of online communication format which supports real-time text, audio, and/or video transmission of "messages" over a network, such as the Internet. Short messages can typically be transmitted bi-directionally between two parties. Some IM applications provide real-time chat functionalities that transmit messages character by character, as they are composed by a user. Other IM applications can provide file transfer, multicast transmission, hyperlink capabilities, Voice over IP (VoIP) functionality, and/or video chat (e.g., Skype™). IM applications typically use peer-to-peer technology or a client-server model, among others, to facilitate the transmission and storage of such messages.

As noted above, when such online conversations are ongoing (e.g., between two or more users), the content of these messages (e.g., in the form of text files, audio files, and/or video files) is organized in a message database. Companies and/or organizations are frequently required to archive such messages (e.g., in a separate/dedicated archive database) to save and make available such messages for compliance and/or discovery during litigation and/or a corporate transaction, among other purposes.

Some messaging applications provide archiving capabilities to export and archive such messages. For example, Microsoft® Corporation provides built-in export and archive functionality for messages created by IM clients/applications such as Lync™ and/or Skype™. For instance, IM messages and/or content created using Lync™ and/or Skype™ can be exported to a storage device using a task management and configuration management framework consisting of a command-line shell (e.g., an Export-CsArchivingData Powershell cmdlet). This "Export cmdlet", for example, enables Lync™ and/or Skype™ conversation data (e.g., IM messages in the form of text files, audio files, and/or video files) to be exported and archived for compliance and/or discovery, as discussed above.

Many data archiving software products archive data by scheduling a window of operation during which the archive process can take place. However, while an archive operation is ongoing during this window of operation, there may exist a need to interrupt or terminate the archive operation for one or more reasons. For example, administrative operations such as the need to configure and/or maintain the archive database, the message database, and/or the archive software itself may require an IT administrator and/or user to interrupt or terminate the ongoing archive operation.

In order to shut down and/or terminate an archiving product (e.g., Enterprise Vault™ provided by Symantec™ Corporation of Mountain View, Calif.), the IT administrator and/or user could terminate the process (e.g., within Lync™ and/or Skype™) running the Export cmdlet (e.g., the Export-CsArchivingData Powershell cmdlet). However, as noted above, abruptly interrupting or terminating this Export cmdlet while an archive operation and/or archive process is ongoing can leave partially written data (e.g., content of online conversations in the form of message files that is being currently exported) on a disk, which in turn, can cause data corruption of such message files.

Disclosed herein are systems, methods, and processes to efficiently and safely interrupt and/or terminate archive operations.

Performing an Archive Operation

Figure 1:
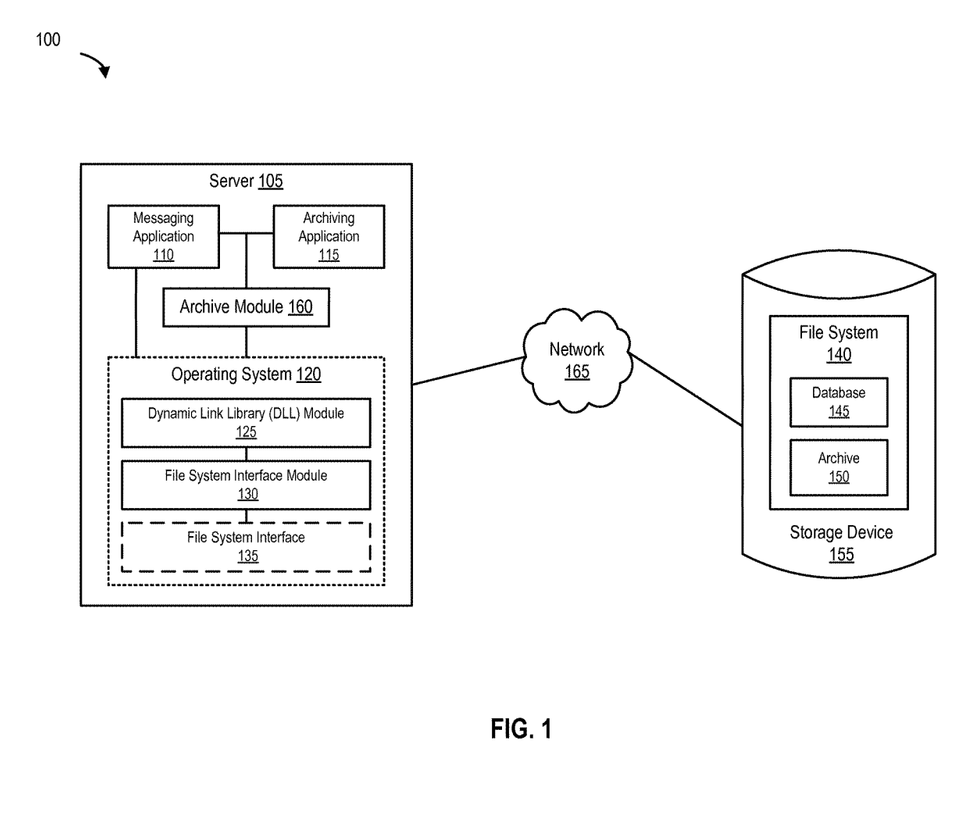
FIG. 1 is a block diagram of a computing system which can implement an archive module, according to one embodiment of the present disclosure.

FIG. 1 is a block diagram of a computing system that can implement an archive module, according to one embodiment. The computing system of FIG. 1 can be configured to interrupt or terminate an ongoing archive operation in an efficient, safe, and timely manner without causing data corruption (e.g., by implementing archive module 160). The computing system of FIG. 1 includes a server 105 coupled to a storage device 155 (which can include one or more of a variety of different storage devices) via a network 165 (any other appropriate network or interconnection can be used instead of and/or in addition to network 165).

Server 105 implements a messaging application 110 (e.g., Lync™, Skype™, etc.), and an archiving application 115 (e.g., an archiving product such as Enterprise Vault™ provided by Symantec™ Corporation of Mountain View, Calif. as noted above). Both the messaging and archiving applications are coupled to archive module 160 which is further coupled to an operating system 120. Operating system 120 includes a Dynamic Link Library (DLL) module 125, a file system interface module 130, and a file system interface 135. File system interface 135 is configured to interact with a file system 140 which is implemented on storage device 155. File system 140 implements and manages database 145 (e.g., a message database), and an archive 150 (e.g., an archive database).

Messaging application 110 facilitates the creation, management, and transfer of message data (e.g., in the form of message files which may include text files, audio files, and/or video files, among other forms and/or formats) between two or more users. For example, once a user of messaging application 110 composes and sends a message to another user (or multiple users), messaging application 110 transmits the message between such users and also organizes the message in database 145. Database 145 can maintain and organize such messages composed and sent over a period of time by multiple users.

As noted above, message data maintained by database 145 may have to be archived for various reasons. Archiving application 115 can export message data (e.g., from local storage of server 105, or from database 145) to storage device 155 (e.g., by using an Export cmdlet). Archive module 160 is configured to interface with operating system 120 and archiving application 115 (as shown in FIG. 1) to monitor and interrupt and/or terminate an ongoing archive operation.

In one embodiment, archive module 160 determines whether an archive operation is ongoing (e.g., whether archiving application 115 is exporting message data from database 145 to archive 150 on storage device 155). Archive module 160 monitors multiple files (e.g., files containing message data) being written to storage device 115 as part of the archive operation. In some embodiments, archive module 160 can receive a request to interrupt or terminate the archive operation (e.g., manually, from an IT administrator or a user, or in some other fashion, for example, from an automated maintenance request by archiving application 115).

Upon receiving the request to interrupt or terminate the archive operation, archive module 160 inhibits (or prevents) initiating of writing of one or more new files to storage device 155, and permits writing of one or more files being written to storage device 155 to complete. Archive module 160 then interrupts or terminates the archive operation. In this example, the files being written to storage device 155 are being monitored as part of creating and closing files (e.g., message files) for the archive operation.

Monitoring Files being Written During an Archive Operation

Figure 2:
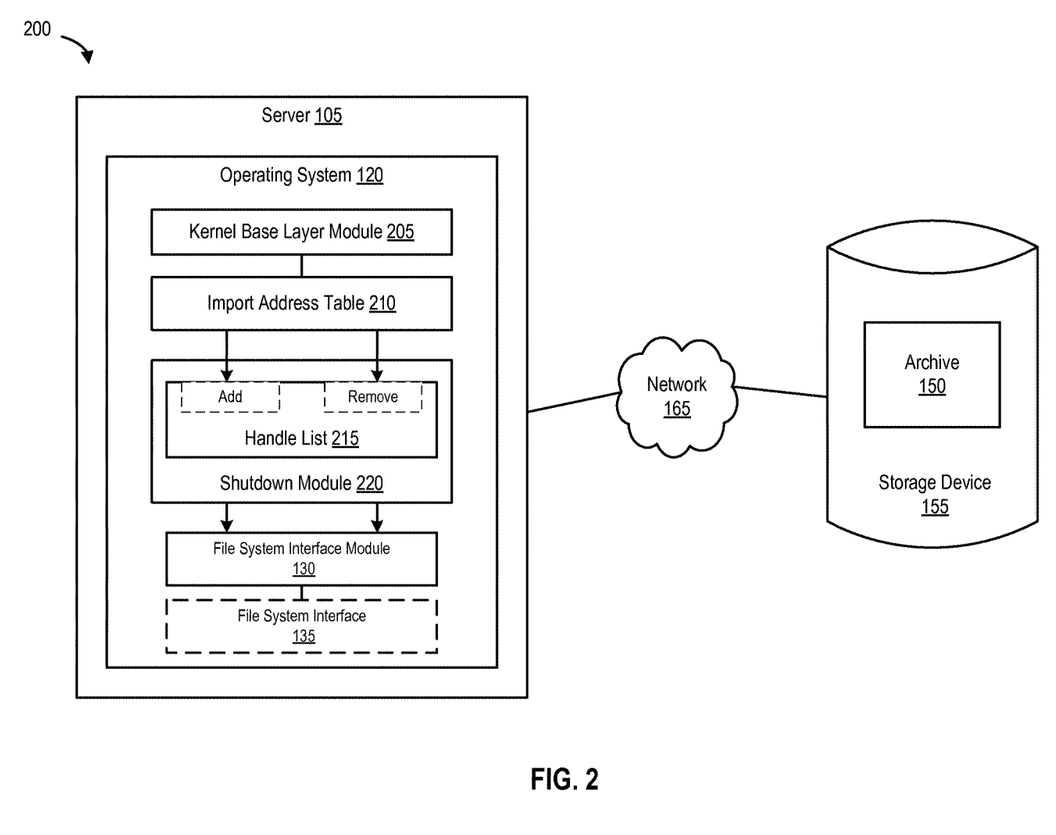
FIG. 2 is a block diagram of a computing system which can execute an archiving operation, according to one embodiment of the present disclosure.

FIG. 2 is a block diagram of a computing system which can execute an archiving operation, according to one embodiment. As illustrated in FIG. 1, server 105 implements operating system 120. As shown in FIG. 2, operating system 120 includes a kernel base layer module 205, an import address table 210, a handle list 215 (implemented by a shutdown module 220), as well as file system module 130 and file system interface 135.

As noted above, a command (e.g., the Export cmdlet) can be used to initiate an archive operation. In one embodiment, one or more file system calls are initiated by operating system 120 in response to the command In this example, the command is created using an application programming interface (API), and when executed, the command starts the archive operation (e.g., by archiving application 115).

As previously noted, archive module 160 can monitor multiple files (e.g., files containing message data) being written to storage device 155 once the command starts the archive operation. As part of the monitoring, shutdown module 220 intercepts the one or more file system calls associated with the files being written to storage device 155 (e.g., to archive 150). Shutdown module 220 performs the interception of the one or more file system calls by accessing import address table 210 (which lists one or more DLLs) to identify file system calls being generated by kernel base layer module 205.

In some embodiments, the one or more file system calls include one or more file operations associated with operating system 120 (e.g., an operation to create a file for archiving, or close a file that is being archived). Therefore, by intercepting these file operations, shutdown module 220, in conjunction with archive module 160, can identify the files being written to storage device 155 as part of the archive operation.

Interrupting or Terminating an Archive Operation

Figure 3:
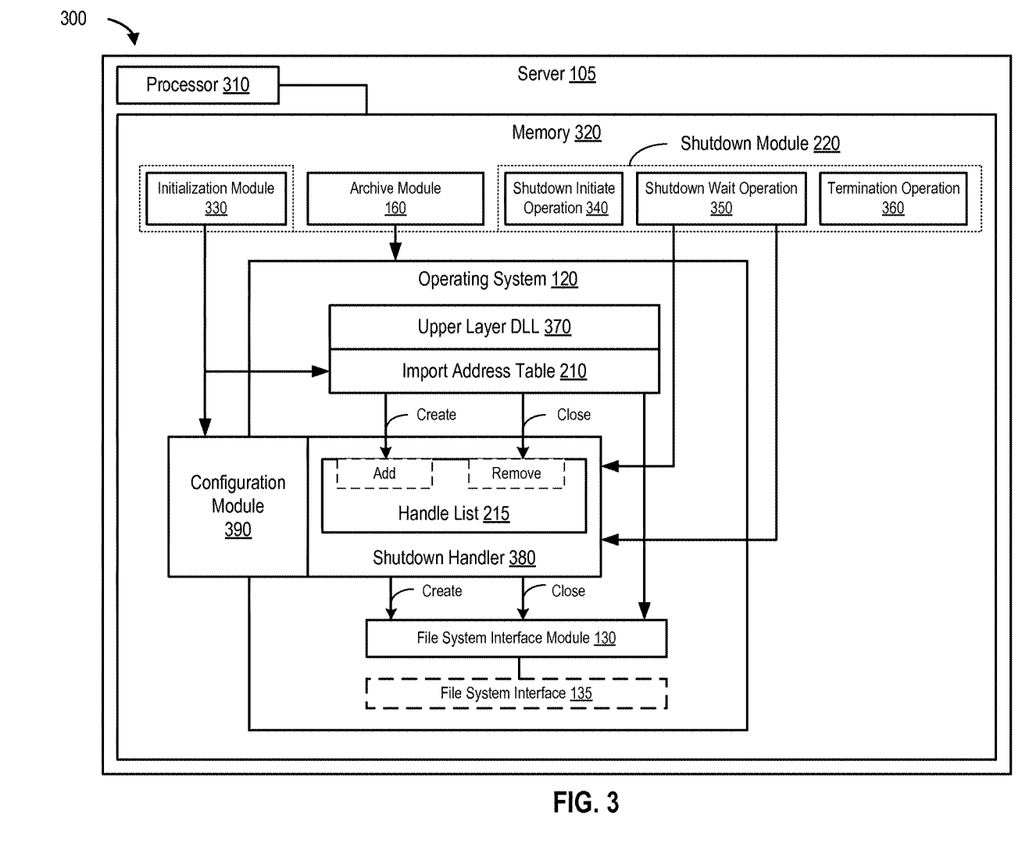
FIG. 3 is a block diagram of a computing system which can interrupt or terminate an archive operation, according to one embodiment of the present disclosure.

FIG. 3 is a block diagram of a computing system which can interrupt or terminate an archive operation, according to one embodiment. FIG. 3 illustrates the various components and functionalities of shutdown module 220. For example, shutdown module 220 includes an initialization module 330, and can perform several operations such as a shutdown initiate operation 340, a shutdown wait operation 350, and a termination operation 360. FIG. 3 also illustrates a configuration module 390, and a shutdown handler 380.

Initialization module 330 uses configuration module 390 to determine whether a request to interrupt or terminate the archive operation has been received at server 105. In this example, and as shown in FIGS. 1 and 2, server 105 is communicatively coupled to archive 150. Archive 150 includes the files being written to storage device 155 as part of the archive operation as well as metadata of the files inhibited from being written to storage device 155.

In one embodiment, when the command is executed, the files exported to an output folder supplied to the command (e.g., by messaging application 110 or archiving application 115) is monitored (e.g., by archive module 160 and/or shutdown module 220). Initialization module 330, in conjunction with shutdown module 220, intercepts one or more file system calls associated with the one or more files that are monitored (e.g., a request to create one or more files for archiving). Initialization module 330 then records a file handle associated with each of the one or more files being monitored in handle list 215.

Shutdown handler 380 accesses handle list 215 and determines whether handle list 215 contains any recorded file handles. When a file is closed (e.g., representing the completion of a successful file export), configuration module 390 removes the successfully-exported file's file handle entry from handle list 215. Thus, once the exported file's file handle entry is removed from handle list 215, handle list 215 only contains the handles of files in the process of being written to storage device 155, for example, as part of the archive operation. It should be noted that, although the foregoing is discussed in terms of files and file handles, in some embodiments, any unit of storage and corresponding identifier(s) can be used.

In another embodiment, and when shutdown module 220 receives a request to interrupt or terminate the archive operation (e.g., a request to interrupt or terminate the Export cmdlet), shutdown module 220 executes shutdown initiate operation 340 and inhibits the initiation of writing of one or more new files to storage device 155, for example, by blocking any new exported files from being created. This blocking is achieved by intercepting a request by archiving application 115 to create files to be archived or written to storage device 155, and ensures that no new files will be added to handle list 215.

In some embodiments, once shutdown module 220 inhibits the initiation of writing of one or more new files to storage device 155, shutdown module 220 executes shutdown wait operation 350 and waits for handle list 215 to become empty by permitting the writing of one or more files being written to storage device 155 to complete. Shutdown module 220 then executes termination operation 360 and interrupts or terminates the archive operation (e.g., by terminating the Export cmdlet).

In another embodiment, shutdown module 220 inhibits the initiation of writing of one or more new files to storage device 155 by refusing further requests to write further files. The alteration of import address table 210 by replacing the addresses of the file system calls with an address of shutdown handler 380, and overriding the file system calls by utilizing import address table 210 to access shutdown handler 380, re-directs create and close requests to shutdown handler 380, rather than the original operation system subroutine. As shown in FIG. 3, and as previously noted, shutdown handler 380 is configured to interact with a lower layer DLL (of the one or more DLLs provided by DLL module 125 as shown in FIG. 1) to achieve the altering and the overriding of the file system calls by identifying the file system calls generated by upper layer DLL 370 (e.g., as implemented by kernel base layer module 205 as shown in FIG. 2).

Therefore, as shown in FIGS. 1, 2, and 3, archive module 160 determines whether an archive operation is ongoing. Archive module 160 in conjunction with configuration module 390 monitors files being written to storage device 155 as part of the archive operation. When a request to interrupt or terminate the archive operation is received, shutdown module 220 inhibits the initiation of writing of new files to storage device 155 by preventing and/or blocking new files from being created (and recorded to handle list 215), and permits the writing of files already being written to storage device 155 to complete (e.g., the remaining files in handle list 215). Shutdown module 220 can then interrupt or terminate the archive operation, safely, without risk of data corruption. In this manner, by inhibiting the initiation of writing of new files to a storage device, the computing system of FIGS. 1, 2, and 3 can interrupt and/or terminate an ongoing archive operation without causing data corruption by preventing partially written data from being left on a disk.

Figure 4A:
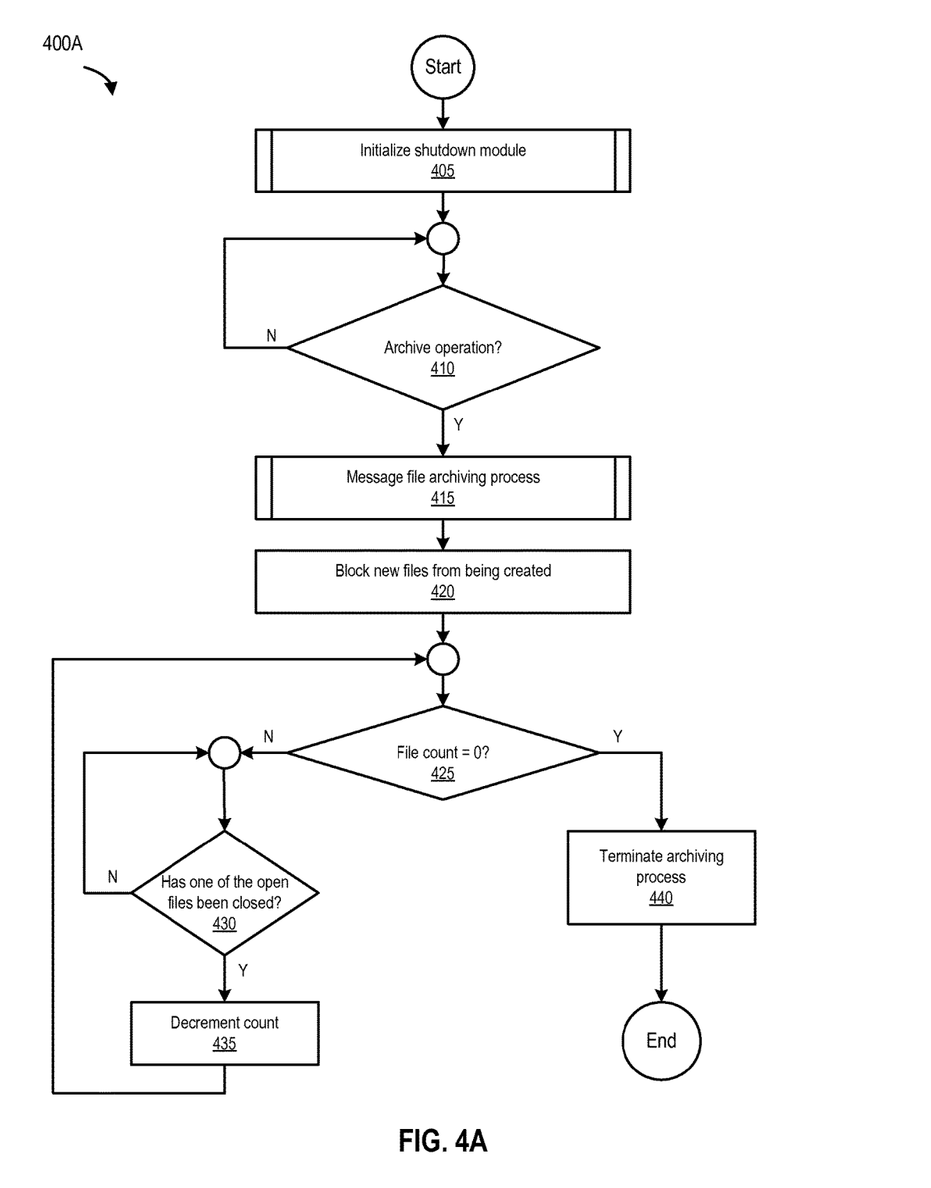
FIG. 4A is a flowchart that illustrates a process for terminating an archive process, according to one embodiment of the present disclosure.

FIG. 4A is a flowchart that illustrates a process for terminating an archive process, according to one embodiment. The process begins at 405 by initializing shutdown module 220 (e.g., using initialization module 330 as shown in FIG. 3). At 410, the process determines whether an archive operation is ongoing (e.g., using archive module 160 as shown in FIGS. 1 and 3). As noted previously, and in one embodiment, the archive operation can be executed by archiving application 115 in response to an Export cmdlet.

At 415, a message file archiving process is performed. As noted, the message file can contain message data in various formats including but not limited to message data in a text format (e.g., DOC, TXT, PDF, etc.), an audio format (e.g., WAV, MP3, AIFF, AU, ALAC, MPEG, WMA, etc.), and/or a video format (e.g., FLV, AVI, WMV, ASF, MP4, MPG, etc.). At 420, the process blocks new files from being created by intercepting and replacing the addresses of the file system calls with an address of shutdown handler 380, and overriding the file system calls by utilizing import address table 210 to access shutdown handler 380 to ensure that no new files are added to handle list 215 (e.g., any further requests to open a file archive is refused).

At 425, the process determines whether the file count in handle list 215 is zero (0). The file count is the number of files that are open (e.g., still being written). If the file count in handle list 215 is not zero (0), the process, at 430, determines whether one of the open files has been closed by determining whether the file has been successfully exported and archived in storage device 155, and whether the file's file handle entry has been removed from handle list 215 (e.g., by executing shutdown wait operation 350 as shown in FIG. 3 which waits and permits the file(s) being written to storage device 155 to complete (and so, being closed)). It should be noted that the handle list is a list of file handle entries of the files that are still open.

If the open file has not been closed, the process reverts back to 425 to determine the file count in handle list 215 (e.g., the number of file handle entries). However, if the open file has been closed, the process decrements the count of handle list 215 (e.g., using shutdown handler 380), and reverts back to 425 to determine whether the file count in handle list 215 has been decremented to zero (0). On the other hand, if the file count in handle list 215 is zero (0), at 440, the archiving process (or operation) is terminated (or interrupted), and the process ends.

Figure 4B:
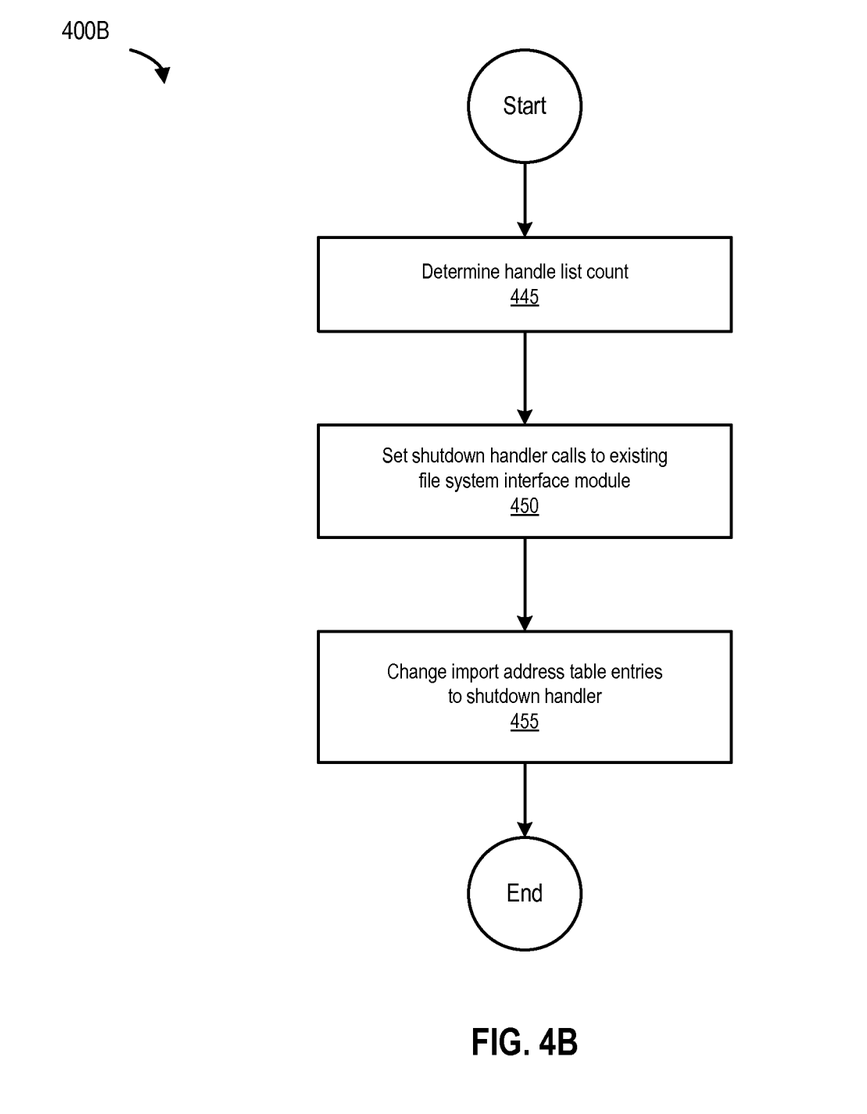
FIG. 4B is a flowchart that illustrates a process for shutting down an archive process, according to one embodiment of the present disclosure.

FIG. 4B is a flowchart that illustrates a shutdown process, according to one embodiment. The process begins at 445 by determining the count of handle list 215. At this point, the process prevents or blocks new files from being created for archiving (e.g., by archiving application 115 using upper layer DLL implemented by kernel base layer module 205). At 450, the process sets shutdown handler calls to file system interface 135 through file system interface module 130 (as illustrated in FIGS. 1, 2, and 3). The process ends at 455 by changing the entries of import address table 210 to shutdown handler 380 (e.g., by intercepting and replacing the addresses of the file system calls with an address of shutdown handler 380, and overriding the file system calls by utilizing import address table 210 to access shutdown handler 380 to ensure that no new files are added to handle list 215).

Figure 4C:
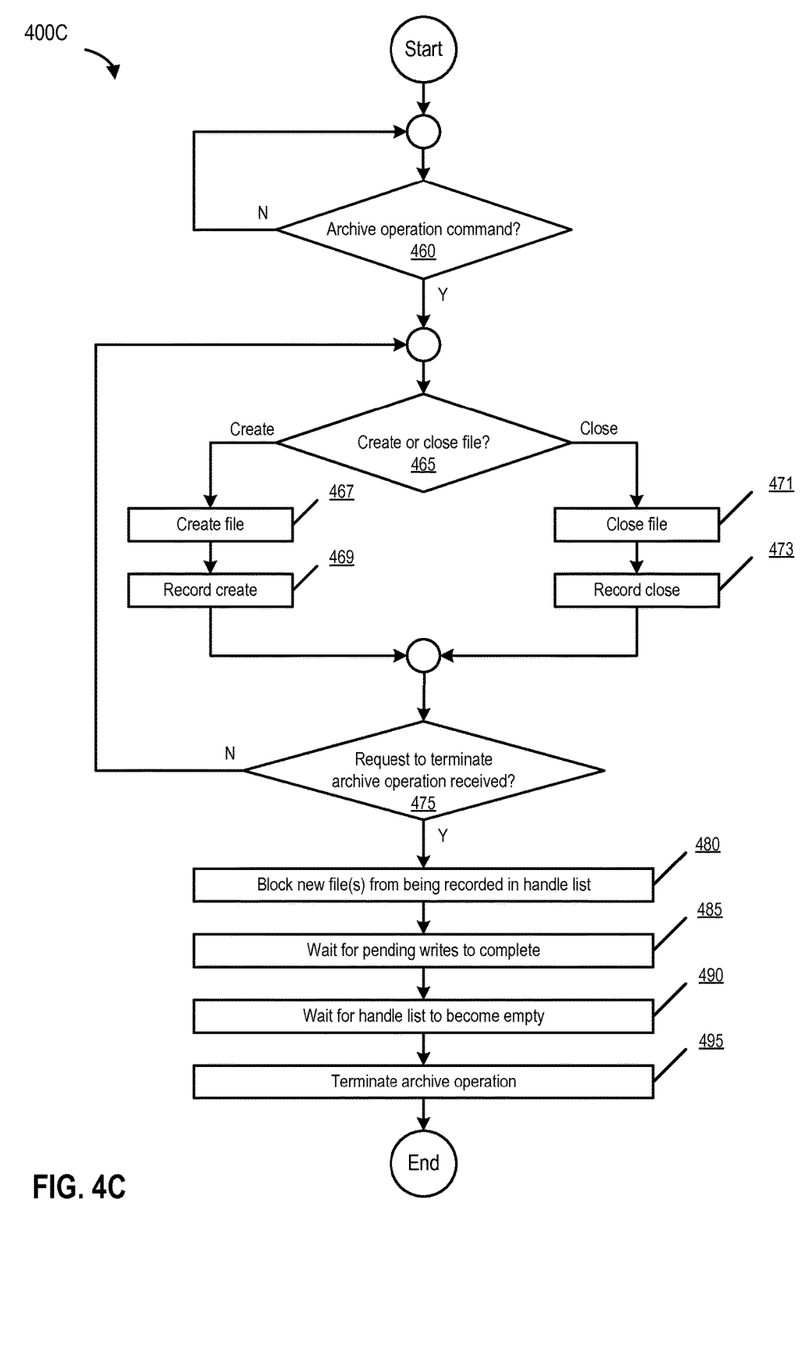
FIG. 4C is a flowchart that illustrates a process for terminating an archive operation, according to one embodiment of the present disclosure.

FIG. 4C is a flowchart that illustrates a process for terminating an archive operation, according to one embodiment. The process begins at 460 by determining whether an archive operation command is received (e.g., whether an Export cmdlet been executed). If the archive operation command has been received, the process, at 465 determines whether the archive operation command requests to create or close file(s). If the request is to create file(s), at 467, the process creates the file, and at 469, records the creation of the file. However, if the request is to close file(s), at 471, the process closes the file, and at 473, records the closing of the file.

At 475, the process determines whether a request to terminate the archive operation has been received (e.g., whether a request to terminate the Export cmdlet has been received). If the request has not been made and/or received, the process continues writing the file (or one more files). However, if the request to terminate the archive operation has been received, for example, at server 105, the process, at 480, blocks new file(s) from being recorded in handle list 215 (e.g., by implementing import address table "hooking" as noted above). At 485, the process waits for pending writes to complete (e.g., by permitting the remaining files in handle list 215 being written to storage device 155 to complete). At 490, the process waits for handle list 215 to become empty, and at 490, the process terminates the archive operation, as requested.

Incrementing or Decrementing Handle List Counts

Figure 5A:
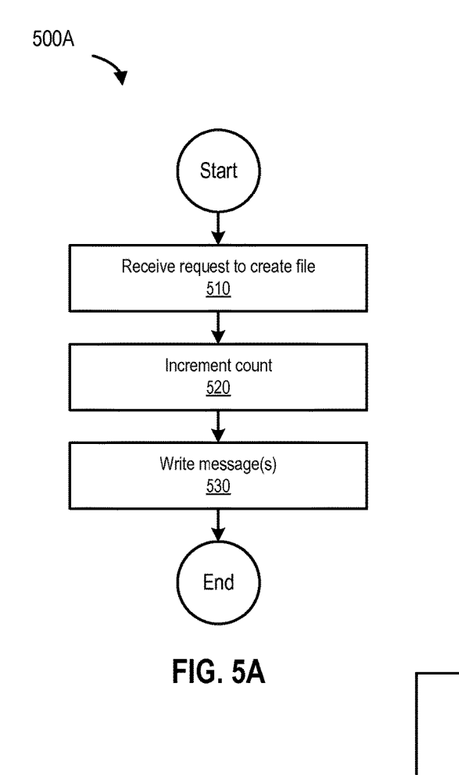
FIG. 5A is a flowchart that illustrates a process for writing a message file to an archive, according to one embodiment of the present disclosure.

FIG. 5A is a flowchart that illustrates a process for writing a message file to an archive, according to one embodiment. The process begins at 510 by receiving a request to create a file (e.g., from archiving application 115). As noted above, this request can include one or more files exported as part of an archive operation. At 520, the process increments the count of handle list 215 to indicate that the message is in the process of being written to storage device 155 as part of the archive operation (e.g., so as to allow shutdown module 220 to permit writing of the message to storage device 155 to complete by executing shutdown wait operation 350). The process ends at 530 by writing the message(s) to storage device 155 as part of the archive operation (e.g., upon execution of the Export cmdlet).

Figure 5B:
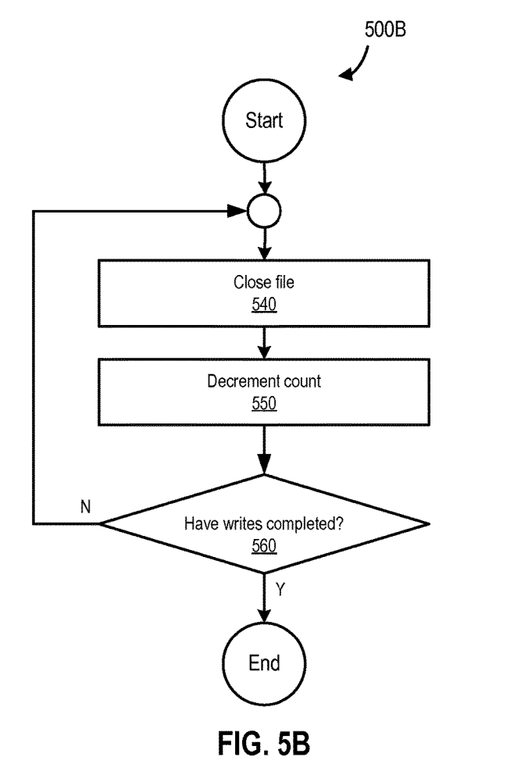
FIG. 5B is a flowchart that illustrates a process for determining whether pending writes to an archive have been completed, according to one embodiment of the present disclosure.

FIG. 5B is a flowchart that illustrates a process for determining whether pending writes to an archive have been completed, according to one embodiment. The process begins at 540 by closing the file. At 550, the process decrements the count of handle list 215 (e.g., to zero (0) if all pending writes have completed). At 560, the process ends by determining whether all pending writes have been completed (e.g., by determining whether there are any remaining file handle entries in handle list 215).

Executing a Shutdown Command

Figure 6A:
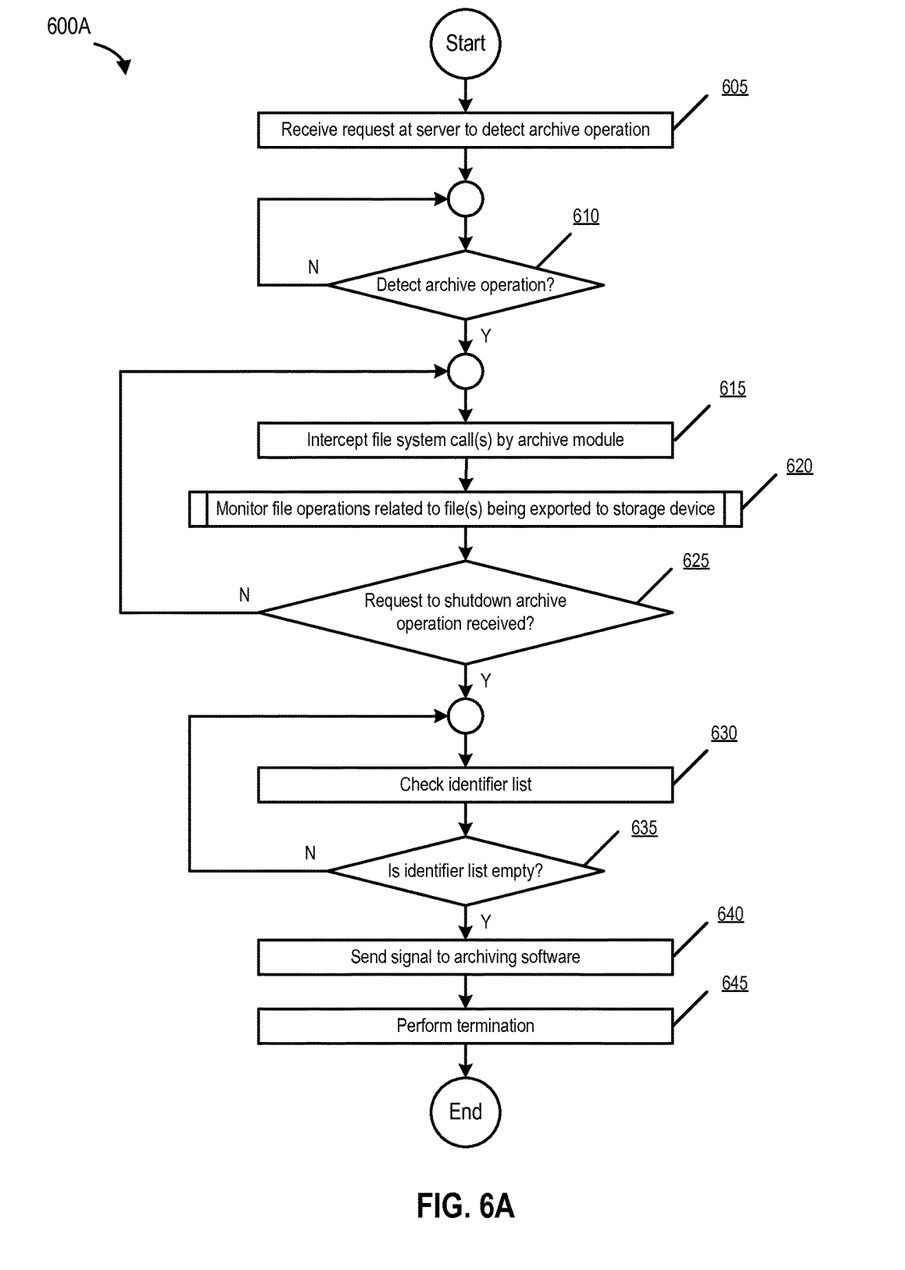
FIG. 6A is a flowchart that illustrates a process for monitoring messages files during an archive operation, according to one embodiment of the present disclosure.

FIG. 6A is a flowchart that illustrates a process for monitoring message files during an archive operation, according to one embodiment. The process begins at 605 by receiving a request at server 105 to detect an archive operation. At 610, the process detects the archive operation. At 615, the process intercepts file system call(s) by archive module 160. At 620, the process monitors file operations related to file(s) being exported to storage device 155 (e.g., as part of the archive operation detected at 610 and which can include recording an identifier for a unit of storage in an identifier list (e.g., the process records file handle entries associated with the file(s) in handle list 215).

At 625, the process determines whether a request to shutdown the archive operation has been received (e.g., whether a request to stop or interrupt the Export cmdlet has been received). If the request has been received, the process, at 630, checks the identifier list (e.g., handle list 215), and at 635, determines whether the identifier list is empty. If the identifier list is empty, the process, at 640, sends a signal to the archiving software (e.g., to archiving application 115 to not create any new files for archiving), and at 645, performs termination (of the archiving operation).

Figure 6B:
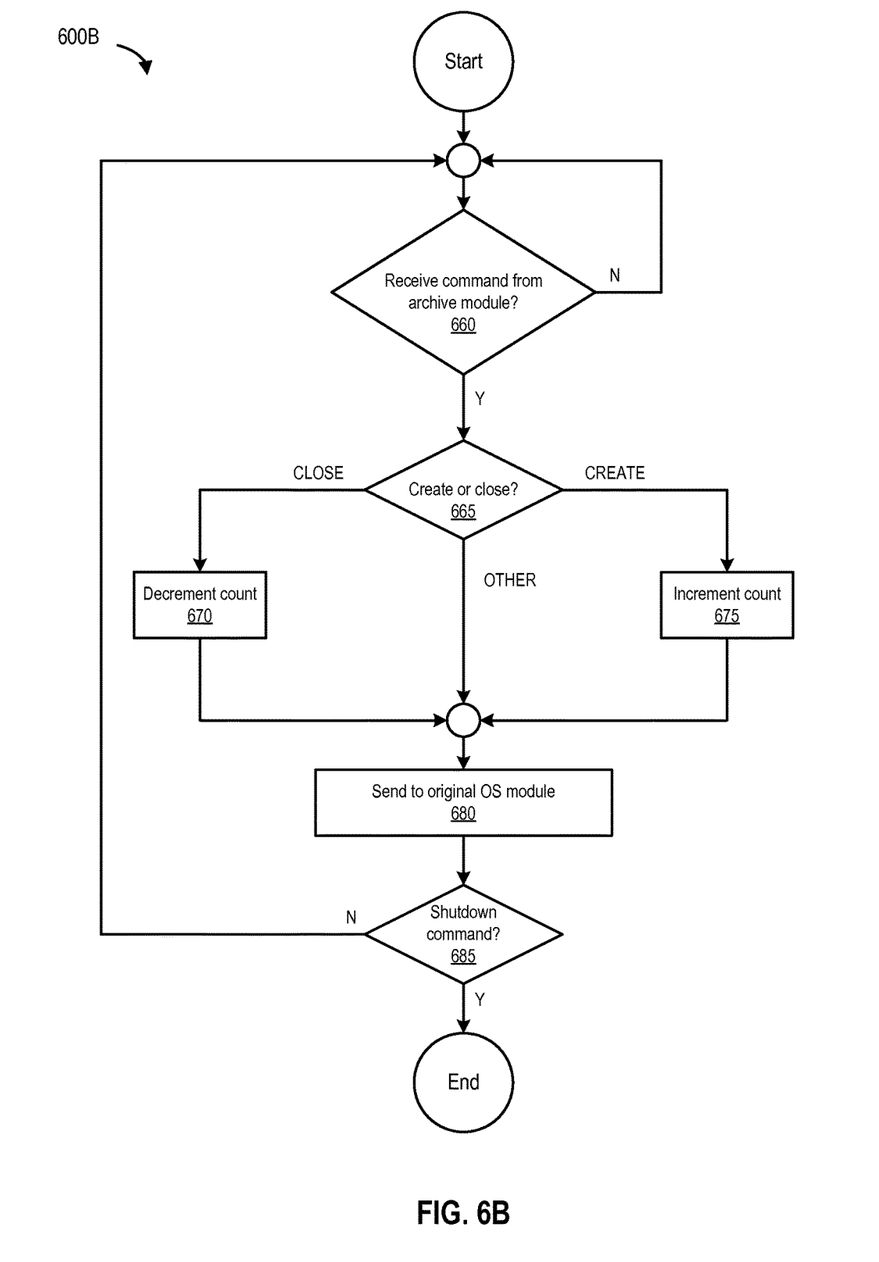
FIG. 6B is a flowchart that illustrates a process for creating or closing message files in response to a shutdown command, according to one embodiment of the present disclosure.

FIG. 6B is a flowchart that illustrates a process for creating or closing message files in response to a shutdown command, according to one embodiment. The process begins at 660 by determining whether a command is received from archive module 160 (e.g., an Export cmdlet). At 665, the process determines whether archive module 160 requests to create or close a file (e.g., a file being written to storage device 155 as part of the archive operation). If archive module 160 closes a file, the process, at 670, decrements the count of handle list 215. However, if archive module 160 creates a file, the process, at 675, increments the count of handle list 215. At 680, the process sends the command to an original OS module. The process ends at 685 if a shutdown command is received.

An Example Computing Environment

Figure 7:
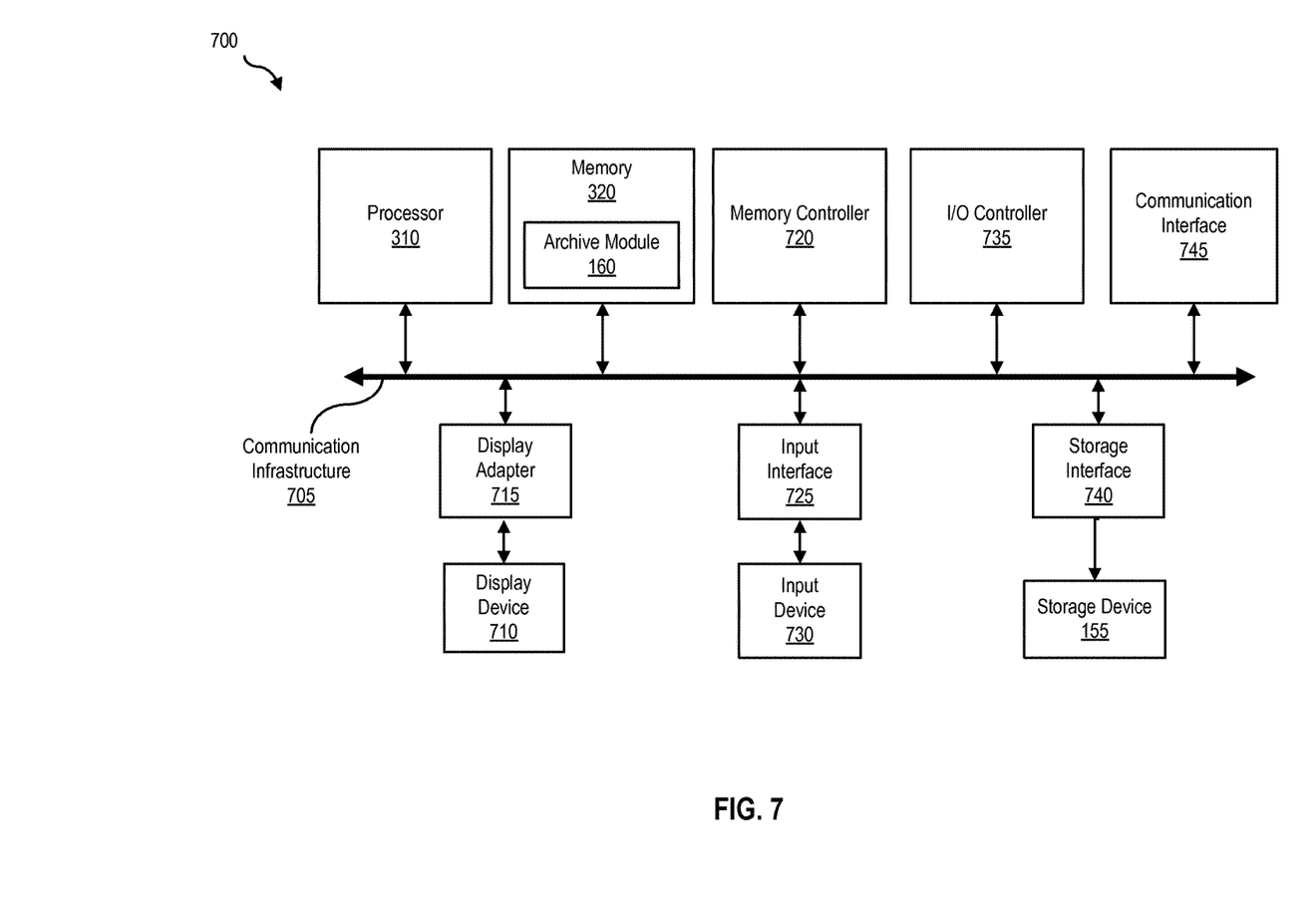
FIG. 7 is a block diagram of a computing system, illustrating how an archive module can be implemented in software, according to one embodiment of the present disclosure.

FIG. 7 is a block diagram of a computing system, illustrating how an archive module can be implemented in software, according to one embodiment of the present disclosure. Computing system 700 broadly represents any single or multi-processor computing device or system capable of executing computer-readable instructions. Examples of computing system 700 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 310 and a memory 320. By executing the software that implements server 105, computing system 700 becomes a special purpose computing device that is configured to efficiently interrupt or terminate an archive operation.

Processor 310 generally represents any type or form of processing unit capable of processing data or interpreting and executing instructions. In certain embodiments, processor 310 may receive instructions from a software application or module. These instructions may cause processor 310 to perform the functions of one or more of the embodiments described and/or illustrated herein. For example, processor 310 may perform and/or be a means for performing all or some of the operations described herein. Processor 310 may also perform and/or be a means for performing any other operations, methods, or processes described and/or illustrated herein.

Memory 320 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 700 may include both a volatile memory unit and a non-volatile storage device. In one example, program instructions implementing an archive module 160 may be loaded into memory 320.

In certain embodiments, computing system 700 may also include one or more components or elements in addition to processor 310 and memory 320. For example, as illustrated in FIG. 7, computing system 700 may include a memory controller 720, an Input/Output (I/O) controller 735, and a communication interface 745, each of which may be interconnected via a communication infrastructure 705. Communication infrastructure 705 generally represents any type or form of infrastructure capable of facilitating communication between one or more components of a computing device. Examples of communication infrastructure 705 include, without limitation, a communication bus (such as an Industry Standard Architecture (ISA), Peripheral Component Interconnect (PCI), PCI express (PCIe), or similar bus) and a network.

Memory controller 720 generally represents any type or form of device capable of handling memory or data or controlling communication between one or more components of computing system 700. For example, in certain embodiments memory controller 820 may control communication between processor 310, memory 320, and I/O controller 735 via communication infrastructure 705. In certain embodiments, memory controller 720 may perform and/or be a means for performing, either alone or in combination with other elements, one or more of the operations or features described and/or illustrated herein.

I/O controller 735 generally represents any type or form of module capable of coordinating and/or controlling the input and output functions of a computing device. For example, in certain embodiments I/O controller 735 may control or facilitate transfer of data between one or more elements of computing system 700, such as processor 310, memory 320, communication interface 745, display adapter 715, input interface 725, and storage interface 740.

Communication interface 745 broadly represents any type or form of communication device or adapter capable of facilitating communication between computing system 700 and one or more additional devices. For example, in certain embodiments communication interface 745 may facilitate communication between computing system 700 and a private or public network including additional computing systems. Examples of communication interface 745 include, without limitation, a wired network interface (such as a network interface card), a wireless network interface (such as a wireless network interface card), a modem, and any other suitable interface. In at least one embodiment, communication interface 745 may provide a direct connection to a remote server via a direct link to a network, such as the Internet. Communication interface 745 may also indirectly provide such a connection through, for example, a local area network (such as an Ethernet network), a personal area network, a telephone or cable network, a cellular telephone connection, a satellite data connection, or any other suitable connection.

In certain embodiments, communication interface 745 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 745 may also allow computing system 700 to engage in distributed or remote computing. For example, communication interface 745 may receive instructions from a remote device or send instructions to a remote device for execution.

As illustrated in FIG. 7, computing system 700 may also include at least one display device 710 coupled to communication infrastructure 705 via a display adapter 715. Display device 710 generally represents any type or form of device capable of visually displaying information forwarded by display adapter 715. Similarly, display adapter 715 generally represents any type or form of device configured to forward graphics, text, and other data from communication infrastructure 705 (or from a frame buffer, as known in the art) for display on display device 710.

As illustrated in FIG. 7, computing system 700 may also include at least one input device 730 coupled to communication infrastructure 705 via an input interface 725. Input device 730 generally represents any type or form of input device capable of providing input, either computer or human generated, to computing system 700. Examples of input device 730 include, without limitation, a keyboard, a pointing device, a speech recognition device, or any other input device.

As illustrated in FIG. 7, computing system 700 may also include storage device 155 to communication infrastructure 705 via a storage interface 740. Storage device 155 generally represents any type or form of storage devices or mediums capable of storing data and/or other computer-readable instructions. For example, storage device 155 may include a magnetic disk drive (e.g., a so-called hard drive), a floppy disk drive, a magnetic tape drive, an optical disk drive, a flash drive, or the like. Storage interface 740 generally represents any type or form of interface or device for transferring and/or transmitting data between storage device 155, and other components of computing system 700.

In certain embodiments, storage device 155 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 155 may also include other similar structures or devices for allowing computer software, data, or other computer-readable instructions to be loaded into computing system 700. For example, storage device 155 may be configured to read and write software, data, or other computer-readable information. Storage device 155 may also be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from that shown in FIG. 7.

Computing system 700 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 700 for storage in memory via a network such as the Internet or upon a carrier medium.

The non-transitory computer-readable medium containing the computer program may be loaded into computing system 700. All or a portion of the computer program stored on the computer-readable medium may then be stored in memory 320 and/or various portions of storage device 155. When executed by processor 310, a computer program loaded into computing system 700 may cause processor 310 to perform and/or be a means for performing the functions of one or more of the embodiments described and/or illustrated herein. Additionally or alternatively, one or more of the embodiments described and/or illustrated herein may be implemented in firmware and/or hardware. For example, computing system 700 may be configured as an application specific integrated circuit (ASIC) adapted to implement one or more of the embodiments disclosed herein.

An Example Networking Environment

Figure 8:
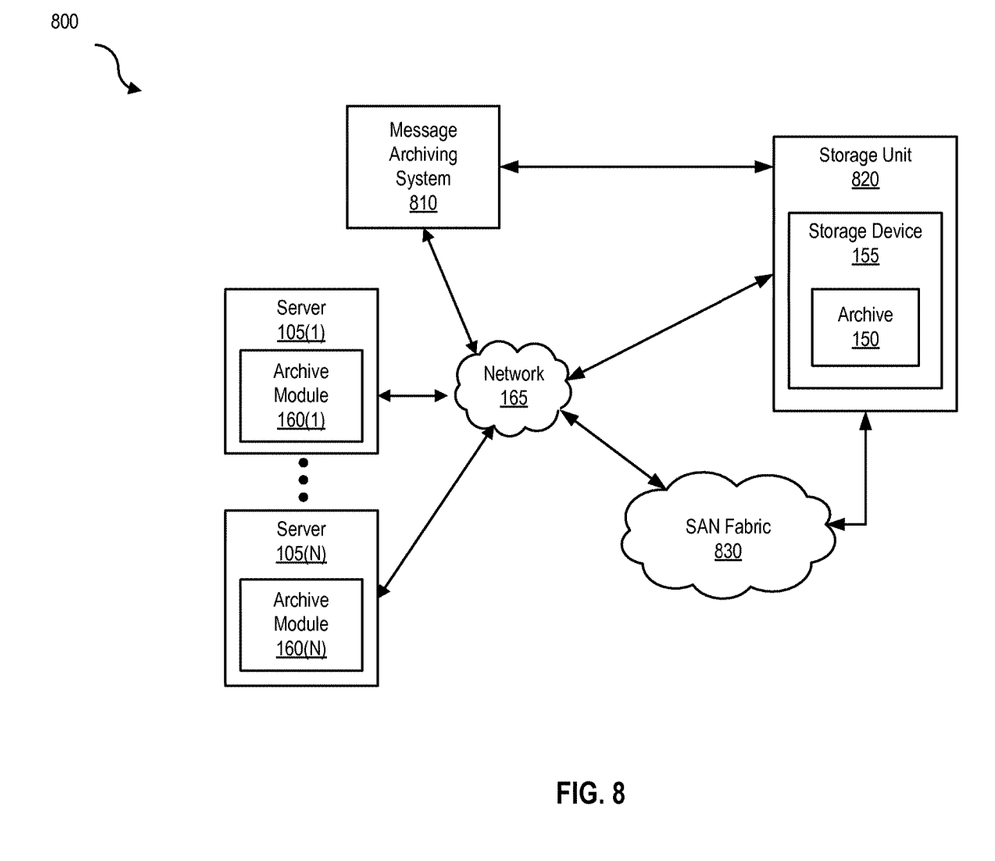
FIG. 8 is a block diagram of a networked system, illustrating how various computing devices can communicate via a network, according to one embodiment of the present disclosure.

FIG. 8 is a block diagram of a networked system, illustrating how various computing devices can communicate via a network, according to one embodiment of the present disclosure. In certain embodiments, network-attached storage (NAS) devices may be configured to communicate with server 105 using various protocols, such as Network File System (NFS), Server Message Block (SMB), or Common Internet File System (CIFS).

Network 165 generally represents any type or form of computer network or architecture capable of facilitating communication between multiple computing devices. Network 165 may facilitate communication between server 105 and storage device 155. In certain embodiments, and with reference to computing system 700 of FIG. 7, a communication interface, such as communication interface 745 in FIG. 7, may be used to provide connectivity between server 105 and network 165. It should be noted that the embodiments described and/or illustrated herein are not limited to the Internet or any particular network-based environment. For example, network 165 can be a Storage Area Network (SAN).

In at least one embodiment, all or a portion of one or more of the embodiments disclosed herein may be encoded as a computer program and loaded onto and executed by server 105, storage device 155, or any combination thereof. All or a portion of one or more of the embodiments disclosed herein may also be encoded as a computer program, stored on server 105 or storage device 155, and distributed over network 165.

In some examples, all or a portion of the computing device in FIG. 1 (e.g., server 105) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, server 105, and/or storage device 155 may transform behavior of a computing device in order to efficiently interrupt or terminate an archive operation.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   determining whether an archive operation is ongoing;
   in response to the archive operation being ongoing,
      monitoring a plurality of files being written to a storage device as part of the archive operation, wherein the monitoring comprises
         intercepting a plurality of file system calls associated with the plurality of files, and
         overriding at least one file system call of the plurality of file system calls;
   receiving a request to interrupt or terminate the archive operation; and
   upon receiving the request,
      inhibiting initiation of writing of one or more new files to the storage device,
      permitting writing of one or more files being written to the storage device to complete, wherein
         the inhibiting and the permitting are performed by virtue of the intercepting and the overriding, and
      interrupting or terminating the archive operation.

2. The method of claim 1, wherein
   the plurality of files being written to the storage device are being monitored as part of creating and closing files for the archive operation.

3. The method of claim 1, wherein
   the monitoring further comprises
      recording a file handle associated with each of the plurality of files in a handle list.

4. The method of claim 3, further comprising:
   determining whether the handle list comprises any recorded file handles, upon accessing the handle list; and
   performing the interrupting or the terminating of the archive operation, if there are no recorded file handles in the handle list.

5. The method of claim 3, wherein
   the plurality of file system calls are initiated by an operating system in response to a command,
   the command is created using an application programming interface (API), and
   when executed, the command starts the archive operation.

6. The method of claim 5, wherein
   the plurality of file system calls comprise one or more file operations associated with the operating system.

7. The method of claim 3, wherein
   the intercepting the plurality of file system calls comprises accessing an import address table, wherein
      the import address table lists one or more Dynamic Link Libraries (DLLs).

8. The method of claim 7, further comprising:
   altering the import address table by replacing addresses of one or more of the plurality of file system calls with an address of a shutdown handler; and
   overriding one or more of the plurality of file system calls by utilizing the import address table to access the shutdown handler, wherein
      the shutdown handler is configured to interact with a lower layer DLL of the one or more DLLs, and
      the plurality of file system calls are initiated by the archiving operation.

9. The method of claim 1, wherein
   the request to interrupt or terminate the archive operation is received at a server, and
   the server is communicatively coupled to an archive.

10. A system comprising:
    one or more processors; and
    a memory coupled to the one or more processors, wherein the memory stores program instructions executable by the one or more processors to:
    determine whether an archive operation is ongoing;
    in response to the archive operation being ongoing,
       monitor a plurality of files being written to a storage device as part of the archive operation, wherein the monitoring comprises
          intercepting a plurality of file system calls associated with the plurality of files, and
          overriding at least one file system call of the plurality of file system calls;
    receive a request to interrupt or terminate the archive operation; and
    upon receiving the request,
       inhibit initiation of writing of one or more new files to the storage device,
       permit writing of one or more files being written to the storage device to complete, wherein
          the inhibiting and the permitting are performed by virtue of the intercepting and the overriding, and
       interrupt or terminate the archive operation.

11. The system of claim 10, wherein
    the plurality of files being written to the storage device are being monitored as part of creating and closing files for the archive operation, and
    the monitoring further comprises
       recording a file handle associated with each of the plurality of files in a handle list.

12. The system of claim 11, further comprising:
    determining whether the handle list comprises any recorded file handles, upon accessing the handle list; and
    performing the interrupting or the terminating of the archive operation, if there are no recorded file handles in the handle list.

13. The system of claim 11, wherein
    the plurality of file system calls are initiated by an operating system in response to a command,
    the command is created using an application programming interface (API), and
    when executed, the command starts the archive operation.

14. The system of claim 13, wherein
    the intercepting the plurality of file system calls comprises accessing an import address table, wherein
       the import address table lists one or more Dynamic Link Libraries (DLLs), and
       the plurality of file system calls comprise one or more file operations associated with the operating system.

15. The system of claim 14, further comprising:
  altering the import address table by replacing addresses of one or more of the plurality of file system calls with an address of a shutdown handler; and
  overriding one or more of the plurality of file system calls by utilizing the import address table to access the shutdown handler, wherein
    the shutdown handler is configured to interact with a lower layer DLL of the one or more DLLs, and
    the plurality of file system calls are initiated by the archiving operation.

16. A non-transitory computer readable storage medium comprising program instructions executable to:
  determine whether an archive operation is ongoing;
  in response to the archive operation being ongoing,
    monitor a plurality of files being written to a storage device as part of the archive operation, wherein the monitoring comprises
      intercepting a plurality of file system calls associated with the plurality of files, and
      overriding at least one file system call of the plurality of file system calls;
  receive a request to interrupt or terminate the archive operation; and
  upon receiving the request,
    inhibit initiation of writing of one or more new files to the storage device,
    permit writing of one or more files being written to the storage device to complete, wherein
      the inhibiting and the permitting are performed by virtue of the intercepting and the overriding, and
    interrupt or terminate the archive operation.

17. The non-transitory computer readable storage medium of claim 16, wherein
  the plurality of files being written to the storage device are being monitored as part of creating and closing files for the archive operation, and
  the monitoring further comprises:
    intercepting the plurality of file system calls associated with the plurality of files, wherein
      the plurality of file system calls are initiated by an operating system in response to a command,
      the plurality of file system calls comprise one or more file operations associated with the operating system,
      the command is created using an application programming interface (API), and
      when executed, the command starts the archive operation; and
    recording a file handle associated with each of the plurality of files in a handle list.

18. The non-transitory computer readable storage medium of claim 17, further comprising:
  determining whether the handle list comprises any recorded file handles, upon accessing the handle list; and
  performing the interrupting or the terminating of the archive operation, if there are no recorded file handles in the handle list.

19. The non-transitory computer readable storage medium of claim 17, wherein the intercepting the plurality of file system calls comprises
  accessing an import address table, wherein
    the import address table lists one or more Dynamic Link Libraries (DLLs).

20. The non-transitory computer readable storage medium of claim 19, further comprising:
  altering the import address table by replacing addresses of one or more of the plurality of file system calls with an address of a shutdown handler; and
  overriding one or more of the plurality of file system calls by utilizing the import address table to access the shutdown handler, wherein
    the shutdown handler is configured to interact with a lower layer DLL of the one or more DLLs, and
    the plurality of file system calls are initiated by the archiving operation.

* * * * *